(12) United States Patent
Egawa et al.

(10) Patent No.: US 6,826,221 B2
(45) Date of Patent: Nov. 30, 2004

(54) LASER OSCILLATOR

(75) Inventors: Akira Egawa, Gotenba (JP); Michinori Maeda, Gotenba (JP); Kazuya Ohta, Fujiyoshida (JP); Akira Miyake, Hiroshima (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/385,529

(22) Filed: Mar. 12, 2003

(65) Prior Publication Data

US 2003/0179797 A1 Sep. 25, 2003

(30) Foreign Application Priority Data

Mar. 22, 2002 (JP) ........................................ 2002-081757

(51) Int. Cl.[7] .......................... H01S 3/22; H01S 3/223
(52) U.S. Cl. .......................... 372/55; 372/56; 372/57; 372/58; 372/59
(58) Field of Search ........................... 372/55, 56, 57, 372/58, 59, 60, 61, 90, 94

(56) References Cited

U.S. PATENT DOCUMENTS 4,787,091 A * 11/1988 Wagner ........................ 372/89
5,537,326 A * 7/1996 Fish ........................... 700/182

* cited by examiner

Primary Examiner—Minsun Oh Harvey
Assistant Examiner—Armando Rodriguez
(74) Attorney, Agent, or Firm—Staas & Halsey LLP

(57) ABSTRACT

A laser oscillator capable of effectively collecting and removing particulate foreign matter contained in gas laser medium flowing in a circulating path. An electric discharge section arranged in an optical resonator is incorporated into a circulating path of the gas medium including a heat exchanger and a blower. The gas laser medium flows at a high speed in the circulating path. At least one spiral-flow dust collecting mechanism is provided in the circular path downstream of the heat exchanger, and the gas laser medium discharged from the blower is supplied to the electric discharge section through the spiral-flow dust collecting mechanism. The gas laser medium containing the particulate foreign matter spirally flows around an inner pipe in a cylindrical body of the spiral-flow dust collecting mechanism. While spirally flowing in the cylindrical body, the foreign matter having a relative density larger than that of the gas medium is separated from the gas medium by centrifugal force, to introduced into a dust collecting section through a slit to be deposited. Pressure of the gas laser medium flowing in the circulating path may be adjusted in accordance with diameter and/or mass of the particulate foreign matter to be removed.

11 Claims, 6 Drawing Sheets

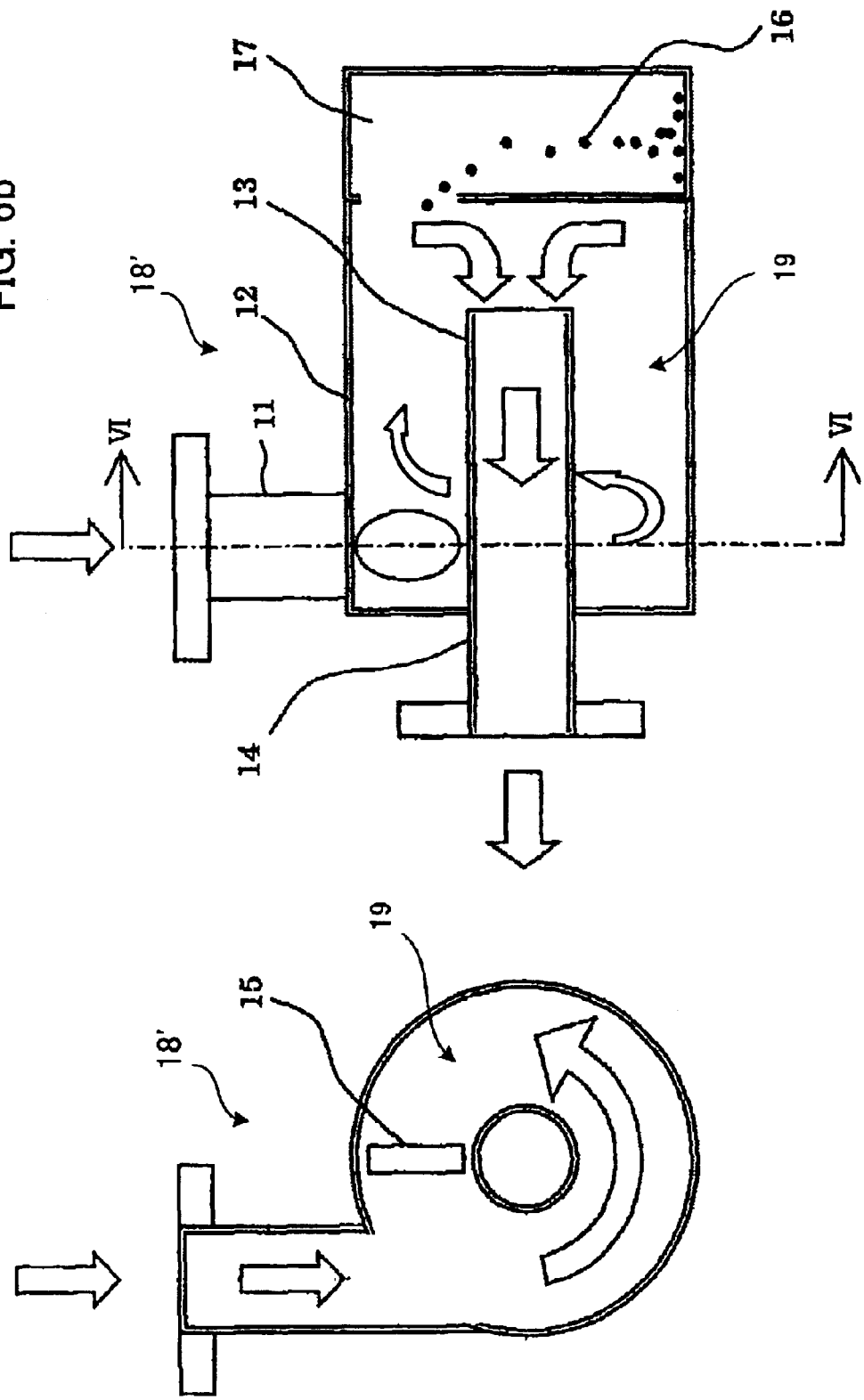

LASER OSCILLATOR

BACKGROUND OF THE INVENTION

1. Field of the Invention

The present invention relates to a laser oscillator using a gas laser medium to be pumped by a light source, a heat source, an electric discharge or a chemical reaction for use in laser machining, medical treatment, illumination, communication, etc. and in particular to a laser oscillator having a function of reducing contamination of optical components in the oscillator by separating and collecting foreign matter in the gas laser medium.

2. Description of Related Art

FIG. 1 shows a general arrangement of a laser oscillator using a laser medium of fluid gas. In FIG. 1, excitation power sources 1 supply alternative current at a radio frequency band on electrodes of electric discharge tubes 2. The electric discharge tubes 2 are disposed between a rear mirror 3 and an output mirror 4 which are held by retainers (not shown). The electric discharge section 2 is incorporated into a circulating path including heat exchangers 5, 7 and a blower 6, through which gas laser medium 8 flows at high speed.

The excitation power source 1 is started to generate electric discharge in the electric discharge tubes 2 to pump the gas medium 8, to generate a laser beam. The gas medium 8 is heated to have a high temperature and cooled by the heat exchanger 5 before the blower 6 and flows into the blower 6 by suction. The blower 6 blows the gas medium 8 from an outlet thereof with pressure. The gas medium 8 is heated to raise its temperature by compression and is cooled again by a heat exchanger 7 provided downstream of the blower 6 to suppress rise of temperature of the gas medium 8. The gas medium 8 discharged from the blower 6 is supplied to the electric discharge section 2 through the heat exchanger 7.

In the above described laser oscillator, it is inevitable that particulate foreign matter such as dust is mixed into the gas medium 8 flowing in the circulating path because of various causes. For instance, in maintenance and production of dust by abrasion of parts in operations of the device and it is hardly possible to completely eliminate such causes. Once the particulate foreign matter is mixed into the gas medium 8, the particulate foreign matter circulates in the laser oscillator with the gas medium 8 without being eliminated, and is caught by the optical components such as the rear mirror 3 and the output mirror 4 to lower output of the laser oscillator and deteriorate the optical components.

Therefore, when the output of the laser power is lowered, it is necessary to clean the mirrors 3 and 4 by disassembling the laser oscillator which requires skill and considerable time to adjust the optical axis of the mirrors 3 and 4 which constitute the laser oscillator in reassembling the mirrors 3 and 4. In the case of a laser oscillator of high power, the mirrors 3 and 4 with the foreign matter caught may cause heat breakage by a local temperature rise when they are irradiated with the laser beam. It is necessary to change the mirrors with new ones, thereby increasing labor and the cost of maintenance.

SUMMARY OF THE INVENTION

An object of the present invention is to provide a laser oscillator having high reliability by reducing contamination of the optical components such as mirrors and requiring less maintenance of cleaning of the optical components.

A laser oscillator of the present invention has a circulating path for circulating gas laser medium subjected to laser pumping by a light source, a heat source, an electric discharge or a chemical reaction. The laser oscillator comprises a spiral flow section provided in the circulating path for producing a spiral flow of the gas laser medium to separate particulate foreign matter contained in the gas medium by centrifugal force generated in the spiral flow; and a dust collecting section arranged in the vicinity of the spiral flow section for collecting the separated particulate foreign matter by deposition.

The laser oscillator may further comprise an adjuster for adjusting pressure of the gas laser medium flowing in the circulating path in accordance with the diameter and/or mass of the particulate foreign matter to be separated and collected.

The spiral flow section may include a cylindrical body and an inner pipe arranged substantially coaxially with the cylindrical body to produce the spiral flow of the gas laser medium.

The inner pipe has an inlet opening to introduce the gas laser medium centrally in a cross-section perpendicular to an axis of the cylindrical body at an end portion of the spiral flow section.

The dust collecting section may be arranged below the spiral flow section, or laterally adjacent to the spiral flow section.

A slit may be formed between said spiral flow section and said dust collecting section to take the separated particulate foreign matter into the dust collecting section.

The slit may be formed at a peripheral position in the spiral flow section, and may be formed to extend substantially perpendicular to the spiral flow of the gas laser medium in the spiral flow section.

According to the present invention, particulate foreign matter contained in the gas laser medium is separated and collected by centrifugal force generated in the spiral flow of the gas laser medium, to prevent dispersion of the foreign matter in a laser resonator of the laser oscillator using the laser medium of fluid gas. Thereby, optical components are prevented from being contaminated by the particulate foreign matter in the gas laser medium, to elongate life of the optical components and prevent reduction of the laser output.

BRIEF DESCRIPTION OF THE DRAWINGS

FIG. 1 is a schematic diagram showing an arrangement of a conventional laser oscillator using a fluid gas laser medium of;

FIG. 5b is a vertical cross-section of the dust collector perpendicular to the cross-section of FIG. 5a;

FIG. 6a is a vertical cross-section of another spiral dust collector along a line VI—VI in FIG. 6b for use in the laser oscillator shown in FIG. 4; FIG. 6b is a vertical cross-section of the dust collector perpendicular to the cross-section of FIG. 6a.

DETAILED DESCRIPTION OF THE PREFERRED EMBODIMENTS

Figure 1:
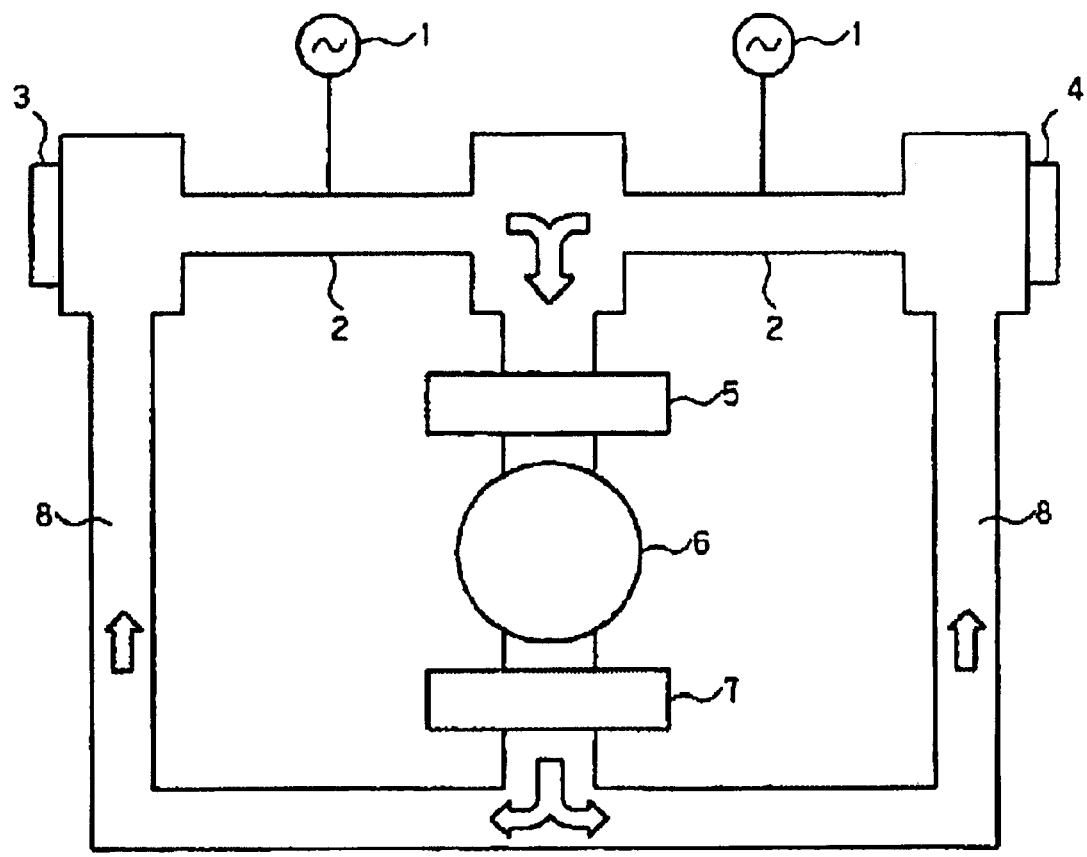
Figure 2:
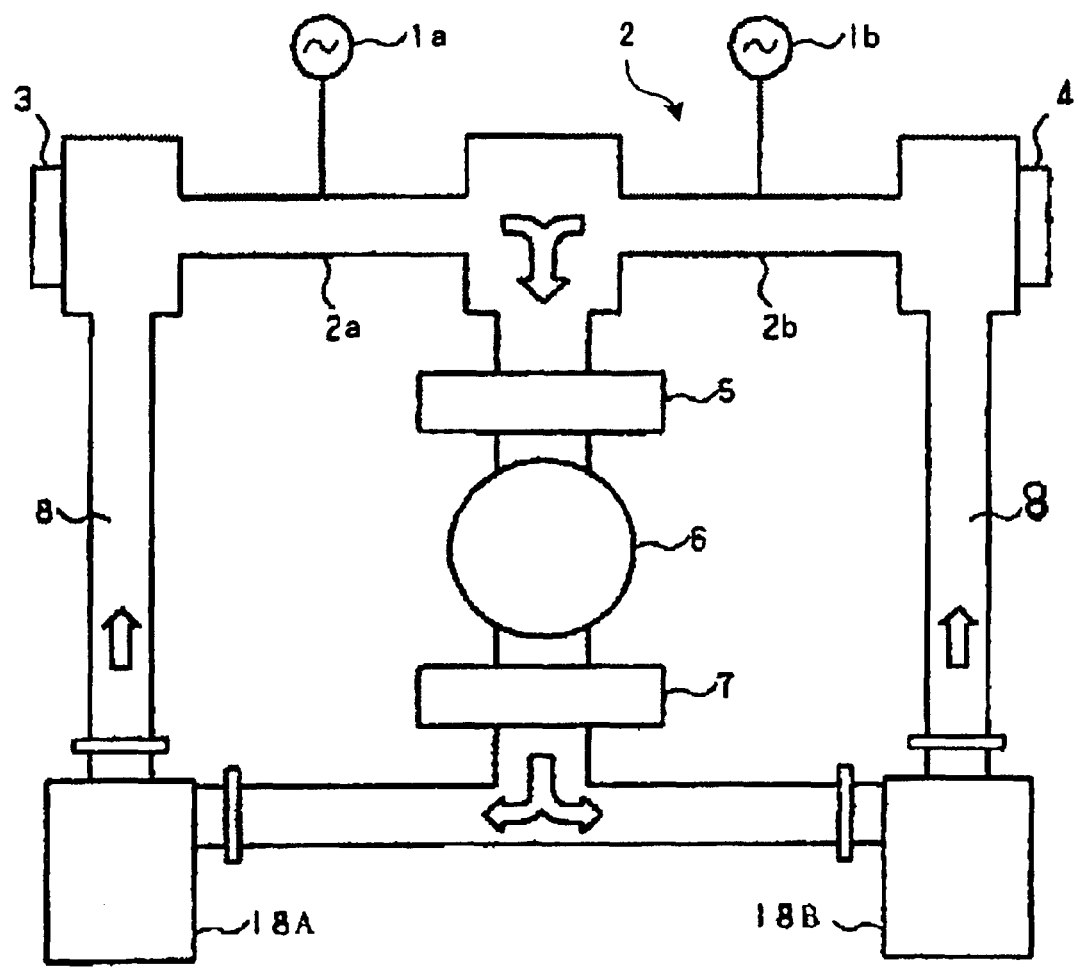
FIG. 2 is a schematic diagram showing an arrangement of a laser oscillator according to an embodiment of the present invention.

FIG. 2 schematically shows an arrangement of a laser oscillator according to an embodiment of the present invention. In the following description, the same reference numeral is assigned to an element of the laser oscillator having the same or equivalent function.

An electric discharge section 2 constituted by electric discharge tubes 2a, 2b which are driven by electric-discharge energizing power sources 1a, 1b is arranged between a rear mirror 3 and an output mirror 4 which constitutes an optical resonator. The mirrors 3 and 4 are held by a holding mechanism (not shown). The electric discharge section 2 is incorporated in a circular path including heat exchangers 5, 7 and a blower 6, through which gas medium 8 flows at high speed.

The electric-discharge energizing power sources 1a, 1b are started to generate electric discharges in the electric discharge tubes 2a, 2b so that the gas medium 8 is pumped to generate a laser beam in the optical resonator. The gas medium 8 heated by the electric discharge to have high temperature is cooled by the heat exchanger 5 before the blower 6 and drawn into the blower 6. The blower 6 blows the gas medium 8 to an outlet side with pressure. The gas medium 8 discharged from the blower 6 is supplied to the electric discharge section 2 through the heat exchanger 7.

The circular path is bifurcated at a downstream side of the heat exchanger 7 and the gas medium 8 discharged from the blower 6 flows through one of spiral-flow dust collecting mechanisms 18A, 18B provided in the bifurcated path downstream of the heat exchanger 7.

Figure 3A:
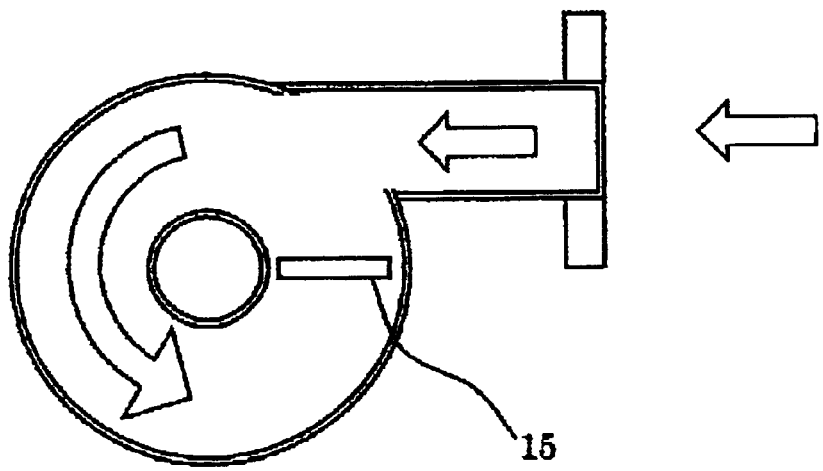
FIG. 3a is a horizontal cross-section of a spiral-flow dust collector along a line III—III in FIG. 5b for use in the laser oscillator shown in FIG. 2.
Figure 3B:
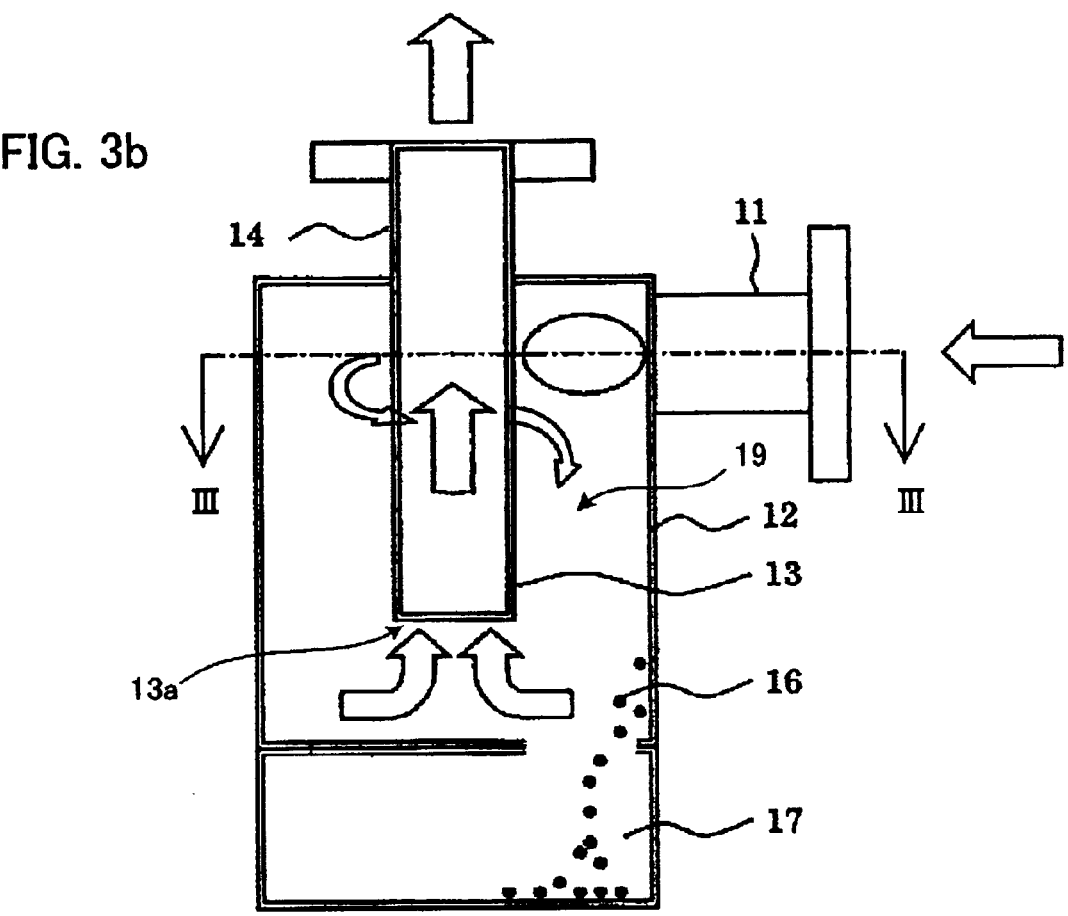
FIG. 3b is a vertical cross-section of the dust collector.

The dust collecting mechanism 18A has a structure as shown in FIGS. 3a and 3b. The other dust collecting mechanism 18B has the substantially same structure and function as those of the dust collecting mechanism 18A except that the dust collecting mechanism 18B has a mirror-symmetrical structure with the dust collecting mechanism 18A in dependence on difference in arrangements of inlets and outlets of the gas medium 8.

Referring to a vertical cross-section of the dust collecting mechanism 18A shown in FIG. 3b, a cylindrical body 12 of the spiral-flow dust collecting mechanism 18A is arranged vertically such that a spiral flow of the gas medium 8 is produced from an upper side to a lower side in a spiral flow chamber 19 formed in the cylindrical body 12. The other dust collecting mechanism 18B is also constituted such that a spiral flow of the gas medium 8 is generated from an upper side to a lower side in a spiral flow chamber formed in the dust collecting mechanism.

An inlet pipe 11 is arranged horizontally to be connected to an upper portion of the cylindrical body 12 such that a horizontal axis of the inlet pipe 11 is offset from a vertical axis of the cylindrical body 12. Inside the cylindrical body 12, an inner pipe 13 is arranged substantially coaxially with the cylindrical body 12 to form a spiral flow chamber 19 in the cylindrical body 12. The inner pipe 13 is continuously connected with an outlet pipe 14 arranged upside of the cylindrical body 12. The inner pipe 13 has a diameter smaller than a diameter of the cylindrical body 12 and has an inlet opening 13a at the lower end thereof. Since the inner pipe 13 is arranged substantially coaxially with the cylindrical body 12, the inlet opening 13a is positioned centrally in a cross-section perpendicular to the axis of the cylindrical body 12.

A dust chamber 17 which functions as a dust collecting section for collecting foreign matter 16 by deposition is provided below the spiral flow chamber 19. A slit 15 is formed at a bottom of the spiral flow chamber 19 to take the foreign matter 16 into the dust chamber 17. The gas medium 8 containing particulate foreign matter 16 such as dust introduced through the inlet pipe 11 spirally flows from the upper side to the lower side in the spiral flow chamber 19 around the inner pipe 13, as shown by arrows in FIGS. 3a and 3b. In the downward spiral flow of the gas medium 8, the particulate foreign matter 16, which has relative density larger than that of the gas medium 8, is separated from the gas medium 8 by centrifugal force to gather at a lower and radially-peripheral portion in the spiral flow chamber 19. The gathered foreign matter 16 falls down through the slit 15 into the dust chamber 17 to be deposited.

Since the slit 15 is formed at radially-peripheral position between the spiral flow chamber 19 and the dust chamber 17 to extend radially of the cylindrical body 12 and thus perpendicular to a direction of the circumferential flow of the gas medium, the gathered foreign matter 16 effectively falls down into the dust chamber 17 and the gas medium 8 does not flow into the chamber 17 even when the gas medium 8 flows at a high speed. Thus, the foreign matter 16 once collected and deposited in the dust chamber 17 hardly returns to the stream of the gas medium 8 by being dispersed again. The gas medium 8 with the foreign matter removed is introduced into the inner pipe 13 from the inlet opening 13a and fed to the outlet pipe 14 to be directed to the electric discharge section 2. The location of the inlet opening 13a of the inner pipe 13 around the central vertical axis of the cylindrical body 12 is advantageous in suppressing drawing of the foreign matter 8 gathered centrifugally in the spiral flow chamber 19 into the inner pipe 13 before falling into the dust chamber 17.

Figure 4:
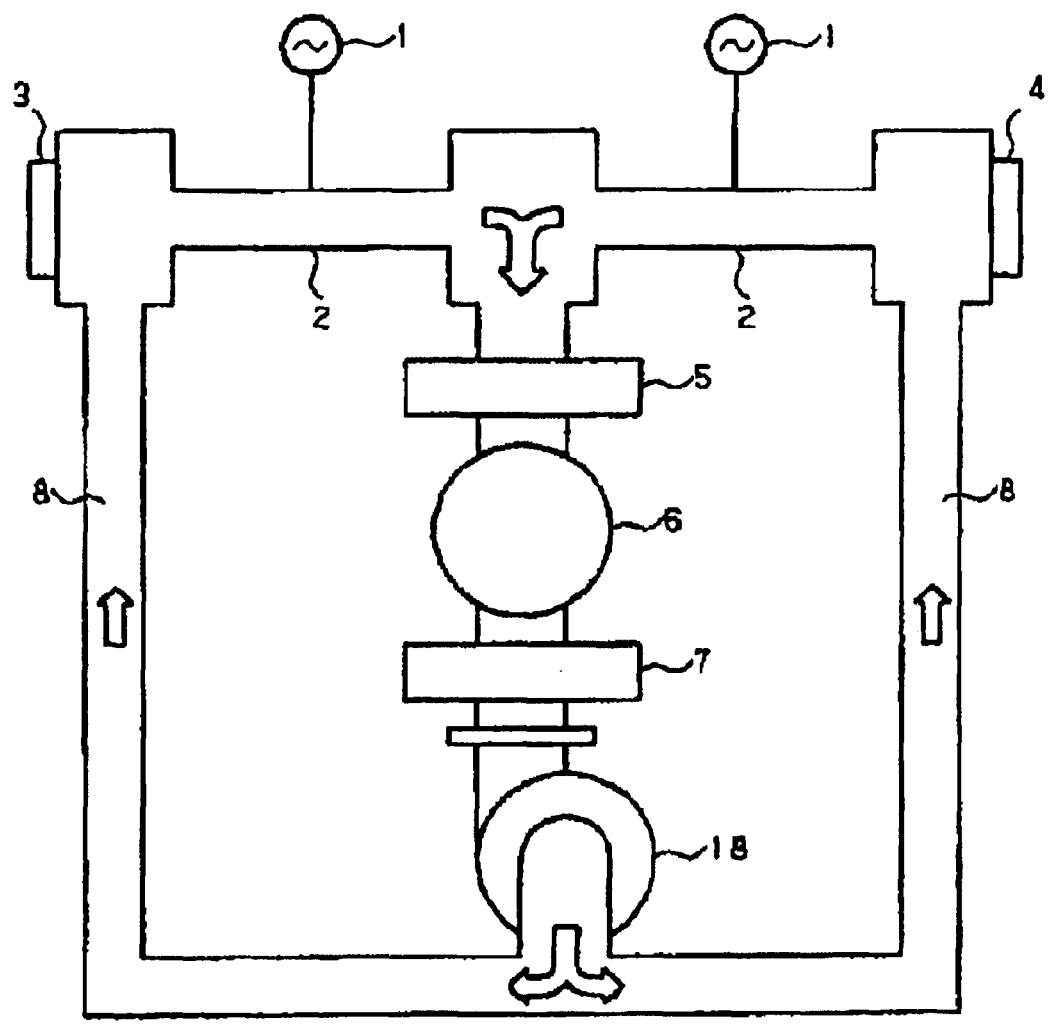
FIG. 4 is a schematic diagram showing an arrangement of a laser oscillator according to another embodiment of the present invention.

FIG. 4 schematically shows an arrangement of a laser oscillator according to another embodiment of the present invention.

The laser oscillator of this embodiment has the same structure as the laser oscillator shown in FIG. 2 except that a single spiral flow dust collecting mechanism 18 is provided in the circulating path of the gas medium 8 downstream of the heat exchanger 7 before the circulating path is bifurcated instead of the two spiral flow dust collecting mechanisms 18A and 18B. Vertical cross-sections of the dust collecting mechanism 18 perpendicular to each other are shown in FIGS. 5a and 5b.

Figure 5B:
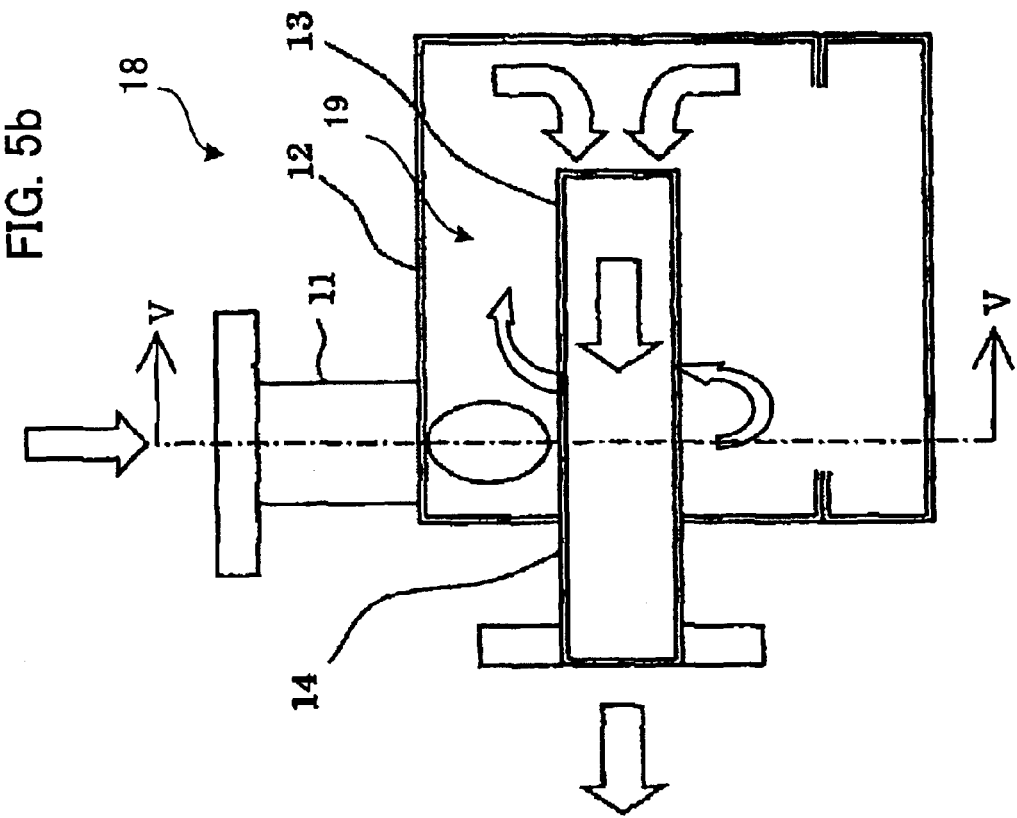
Figure 5A:
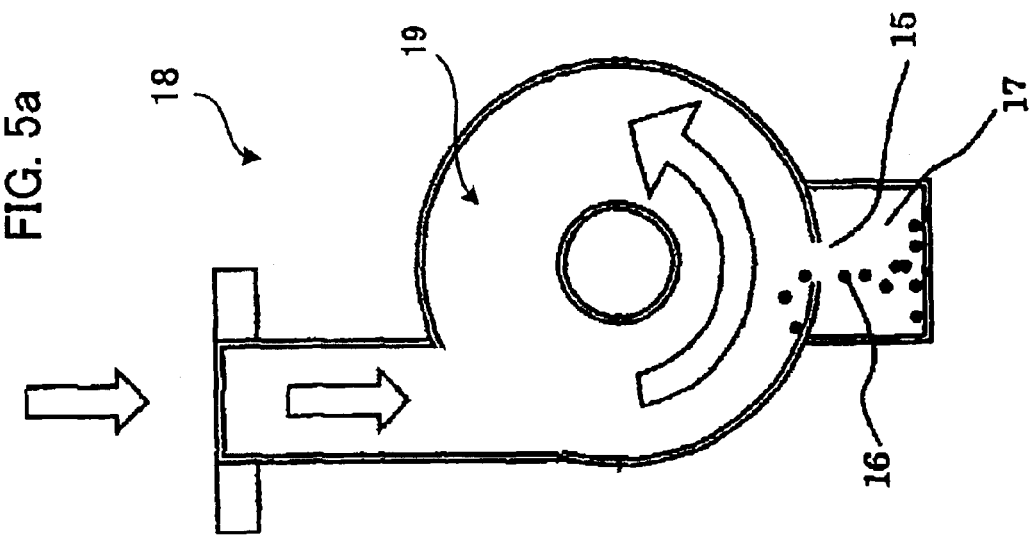
FIG. 5a is a vertical cross-section of a spiral-flow dust collector along a line V—V in FIG. 5b for use in the laser oscillator shown in FIG. 4.

Referring to FIGS. 5a and 5b, the cylindrical body 12 is arranged horizontally such that a spiral flow of the gas medium 8 is produced around an horizontal axis of the cylindrical body 12.

The inlet pipe 11 is arranged vertically to be connected to a left end portion of the cylindrical body 12 in FIG. 5a such that a vertical axis of the inlet pipe 11 is offset from a horizontal axis of the cylindrical body 12. Inside the cylindrical body 12, an inner pipe 13 is arranged substantially coaxially with the cylindrical body 12 to form a spiral flow chamber 19 in the cylindrical body 12. The inner pipe 13 is continuously connected with an outlet pipe 14 arranged outside of the cylindrical body 12. The inner pipe 13 has a diameter smaller than a diameter of the cylindrical body 12 and has an inlet opening 13a at the right end thereof in FIG. 5b. Since the inner pipe 13 is arranged substantially coaxially with the cylindrical body 12, the inlet opening 13a is positioned centrally in a cross-section perpendicular to the axis of the cylindrical body 12.

The dust chamber 17 which functions as a dust collecting section for collecting foreign matter 16 by deposition is provided below the spiral flow chamber 19. A slit 15 is formed at a bottom of the spiral flow chamber 19 to take the foreign matter 16 into the dust chamber 17. The gas medium 8 containing particulate foreign matter 16 introduced through the inlet pipe 11 spirally flows from the left-hand side to the right-hand side in the spiral flow chamber 19 around the inner pipe 13, as shown by arrows in FIGS. 5*a* and 5*b*. In the horizontal spiral flow of the gas medium 8, the particulate foreign matter 16 is separated from the gas medium 8 by centrifugal force to gather at a radially-peripheral portion in the spiral flow chamber 19. The gathered foreign matter 16 falls down through the slit 15 into the dust chamber 17 to be deposited.

Since the slit 15 is formed between the spiral flow chamber 19 and the dust chamber 17 to extend parallel to the horizontal axis of the cylindrical body 12 and thus perpendicular to a direction of the circumferential flow of the gas medium, the gathered foreign matter 16 effectively falls down into the dust chamber 17 and the gas medium 8 does not flow into the chamber 17 even when the gas medium 8 flows at a high speed. Thus, the foreign matter 16 once collected and deposited in the dust chamber 17 hardly returns to the stream of the gas medium 8. The gas medium 8 with the foreign matter removed is introduced into the inner pipe 13 from the inlet opening 13*a* and fed to the outlet pipe 14 to be directed to the electric discharge section 2. The location of the inlet opening 13*a* of the inner pipe 13 near the central horizontal axis of the cylindrical body 12 is advantageous in suppressing drawing of the foreign matter 8 gathered centrifugally in the spiral flow chamber 19 into the inner pipe 13 before falling into the dust chamber 17.

FIGS. 6*a* and 6*b* shows another example of the spiral-flow dust collecting mechanism for use in the laser oscillator shown in FIG. 4. A spiral-flow dust collecting mechanism 18' shown in FIGS. 6*a* and 6*b* is different from the spiral-flow dust collecting mechanism 18 shown in FIGS. 5*a* and 5*b* in arrangement of the dust chamber and the slit. FIGS. 6*a* and 6*b* show vertical cross-sections of the dust collecting mechanism 18' perpendicular to each other.

As shown in FIG. 6*b*, the dust chamber 17 is provided laterally adjacent to the spiral flow chamber 19 at a downstream side, e.g. a right side in FIG. 6*b*, of the spiral flow chamber 19. The slit 15 is formed at an upper portion of right end of the spiral flow chamber 19 to take the foreign matter 16 into the dust chamber 17. The gas medium 8 containing particulate foreign matter 16 introduced through the inlet pipe 11 spirally flows from the left-hand side to the right-hand side in the spiral flow chamber 19 around the inner pipe 13, as shown by arrows in FIGS. 6*a* and 6*b*. In the horizontal spiral flow of the gas medium 8, the particulate foreign matter 16 is separated from the gas medium 8 by centrifugal force to gather at radially-peripheral portion in the spiral flow chamber 19.

The spiral flow of the gas medium 8 rapidly changes its direction immediately before being introduced into the inner pipe 13. The gas medium 8 containing the foreign matter 16 changes its state from a state having momentum in a direction from the left-hand side to the right-hand side to a state having momentum in a direction from the right-hand side to the left-hand side. In this transition of the flow direction, since the foreign matter 6 has relative density larger than that of the gas medium 8 and thus larger inertia, the most of the foreign matter 6 is separated from the gas medium 8 and introduced into the dust chamber 17 to be deposited through the slit 15.

Since the slit 15 is formed at radially-peripheral position between the spiral flow chamber 19 and the dust chamber 17 to extend radially of the cylindrical body 12 and thus substantially perpendicular to a direction of the circumferential flow of the gas medium, the gathered foreign matter 16 effectively taken into the dust chamber 17 and the gas medium 8 does not flow into the chamber 17 even when the gas medium 8 flows at a high speed. Thus, the foreign matter 16 once collected and deposited in the dust chamber 17 hardly returns to the stream of the gas medium 8. The gas medium 8 with the foreign matter removed is introduced into the inner pipe 13 from the inlet opening 13*a* and fed to the outlet pipe 14 to be directed to the electric discharge section 2. The location of the inlet opening 13*a* of the inner pipe 13 around the central horizontal axis of the cylindrical body 12 is advantageous in suppressing drawing of the foreign matter 8 gathered centrifugally in the spiral flow chamber 19 into the inner pipe 13 before taken into the dust chamber 17.

An adjustment of pressure of the gas medium 2 in the circulating path to generate the spiral flow will be described. As well known in the art, the blower 6 has a function of adjusting a blowing pressure of the gas medium (e.g. adjustment by a pressure adjusting dial, manual operation of keys on a control panel). It is preferable to adjust the blowing pressure of the gas medium in view of diameter and/or mass of the foreign matter to be separated and collected for removal. The adjustment may be performed while the laser oscillator is stopped, e.g. before a start of operation.

Specifically, if the blowing pressure of the gas medium is set higher, the flow speed of the gas medium is made high to effectively separate a heavy foreign matter or a foreign matter having relatively large diameter. On the other hand, in order to effectively separate a light foreign matter or a foreign matter having a relatively small diameter, the blowing pressure of the gas medium is set lower to make the flow speed of the gas medium low. Therefore, a plurality of grades, e.g. three grades of blowing pressure are set in advance, and the gas medium is circulated at respective grades of blowing pressure at respective predetermined time periods without laser oscillation, to effectively remove the foreign matter of various diameters and masses from the gas medium.

According to the present invention, particulate foreign matter such as dust contained in a gas medium is effectively removed and collected from the gas medium by providing a spiral flow path through which the gas medium flows spirally in a circulating path of the gas medium of a laser oscillator. Thus, the particulate foreign matter which may be caught by optical components such as mirrors of the laser oscillator is greatly reduced in the laser oscillator, so that reduction of an output power of the laser oscillator and damage of the optical components are prevented, to provide a laser oscillator of high reliability and requiring less maintenance of cleaning of the optical components.

What is claimed is:

1. Apparatus comprising:
    a laser oscillator having a circulating path to circulate a gas laser medium subjected to laser pumping;
    a spiral flow section provided in the circulating path to produce a spiral flow of the gas laser medium to separate particulate foreign matter contained in the gas laser medium by centrifugal force produced by in the spiral flow; and
    a dust collecting section arranged in the vicinity of said spiral flow section to collect the separated particulate foreign matter by deposition.

2. Apparatus according to claim 1, further comprising an adjuster to adjust pressure of the gas laser medium flowing in the circulating path in order to separate and collect particulate foreign matter having varying diameter and/or mass.

3. Apparatus according to claim 1, wherein said spiral flow section includes a cylindrical body and an inner pipe arranged substantially coaxially with the cylindrical body to produce the spiral flow of the gas laser medium.

4. Apparatus according to claim 3, wherein said inner pipe has an inlet opening to introduce the gas laser medium centrally in a cross-section perpendicular to an axis of the cylindrical body at an end portion of said spiral flow section.

5. Apparatus according to claim 1, wherein said dust collecting section is arranged below the spiral flow section.

6. Apparatus according to claim 1, wherein said dust collecting section is arranged laterally adjacent to the spiral flow section.

7. Apparatus according to claim 1, wherein a slit is formed between said spiral flow section and said dust collecting section to take the separated particulate foreign matter into said dust collecting section.

8. Apparatus according to claim 7, wherein said slit is formed at a peripheral position in the spiral flow section.

9. Apparatus according to claim 7, wherein said slit is formed to extend substantially perpendicular to the spiral flow of the gas laser medium in the spiral flow section.

10. Apparatus comprising:

a laser oscillator having a circulating path to circulate a gas laser medium subjected to laser pumping;

a spiral-flow dust collecting mechanism provided in the circulating path to produce a spiral flow of the gas laser medium to separate particulate foreign matter contained in the gas laser medium and to collect the separated particulate foreign matter.

11. An apparatus according to claim 10, further comprising an adjuster to adjust pressure of the gas laser medium flowing in the circulating path in order to separate and collect particulate foreign matter having varying diameter and/or mass.

* * * * *